US009151578B2

(12) United States Patent
Enzmann et al.

(10) Patent No.: US 9,151,578 B2
(45) Date of Patent: Oct. 6, 2015

(54) UNLOCKING DEVICE

(75) Inventors: Ernst Enzmann, Grassau (DE); Achim Hofmann, Tussling (DE); Rolf Ruckdeschel, Heldenstein (DE); Johann Seidl, Toging (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 11 days.

(21) Appl. No.: 14/001,691

(22) PCT Filed: Dec. 8, 2011

(86) PCT No.: PCT/EP2011/006185
§ 371 (c)(1),
(2), (4) Date: Aug. 27, 2013

(87) PCT Pub. No.: WO2012/119628
PCT Pub. Date: Sep. 13, 2012

(65) Prior Publication Data
US 2013/0333548 A1 Dec. 19, 2013

(30) Foreign Application Priority Data

Mar. 7, 2011 (DE) .......................... 10 2011 013 255

(51) Int. Cl.
B60R 21/20 (2011.01)
F42B 3/00 (2006.01)
B60N 2/48 (2006.01)
B60R 21/13 (2006.01)
E05B 51/02 (2006.01)
E05B 81/02 (2014.01)

(52) U.S. Cl.
CPC .............. *F42B 3/006* (2013.01); *B60N 2/4885* (2013.01); *B60R 21/13* (2013.01); *E05B 51/023* (2013.01); *B60R 2021/135* (2013.01); *E05B 81/02* (2013.01)

(58) Field of Classification Search
USPC .......... 280/740–742; 102/530, 531, 335, 336, 102/275.12; 89/1.14; 29/428, 453
See application file for complete search history.

(56) References Cited

U.S. PATENT DOCUMENTS 5,641,131 A * 6/1997 Schmid et al. ................ 242/374
6,352,285 B1 * 3/2002 Schulte et al. ................ 280/756
6,675,692 B1 1/2004 Goetz
(Continued)

FOREIGN PATENT DOCUMENTS

CN 2473010 1/2002
CN 101312849 11/2008
(Continued)

*Primary Examiner* — Faye M Fleming
(74) *Attorney, Agent, or Firm* — Tarolli, Sundheim, Covell & Tummino LLP

(57) ABSTRACT

The invention relates to an unlocking device (10), especially for a vehicle protection device, comprising a locking bar (16) which in a locked position establishes a connection positive at least in portions between a first component (12) to be unlocked and a second component (14) and permits relative motion of the two components (12, 14) in an open position. The unlocking device (10) further comprises a pyrotechnical actuator (18) including a pyrotechnical element (20) having a propelling charge and a piston-cylinder unit (22) having a piston (24) and a cylinder (26), wherein motion of the piston (24) or the cylinder (26) can be generated due to activation of the propelling charge upon ignition thereof and wherein the piston-cylinder unit (22) is connected to the locking bar (16) without redirection so that upon motion of the piston (24) or the cylinder (26) the locking bar is movable from its locked position into its open position.

13 Claims, 4 Drawing Sheets

(56) References Cited

U.S. PATENT DOCUMENTS

| | | |
|---|---|---|
| 2002/0135166 A1 | 9/2002 | Thomas |
| 2003/0196544 A1 | 10/2003 | Comtesse |
| 2004/0255811 A1 | 12/2004 | Brede et al. |
| 2005/0151393 A1 | 7/2005 | Borg et al. |
| 2005/0212273 A1 | 9/2005 | Thomas et al. |
| 2009/0301339 A1 | 12/2009 | Ito et al. |
| 2010/0109307 A1 | 5/2010 | Beki et al. |
| 2010/0171296 A1 | 7/2010 | Rohner et al. |
| 2010/0187797 A1 | 7/2010 | Debler et al. |

FOREIGN PATENT DOCUMENTS

| | | |
|---|---|---|
| DE | 19922674 | 11/2000 |
| DE | 10210328 | 10/2002 |
| DE | 10303377 | 8/2004 |
| DE | 102004015808 | 3/2005 |
| DE | 102005012614 | 10/2005 |
| DE | 60115539 | 7/2006 |
| DE | 60306245 | 5/2007 |
| DE | 102006016155 | 11/2007 |
| DE | 102007042123 | 4/2008 |
| DE | 102008002135 | 9/2009 |
| DE | 102009023961 | 12/2009 |
| DE | 102008043443 | 5/2010 |
| DE | 102009005771 | 7/2010 |
| DE | 102009001536 | 9/2010 |
| EP | 1514740 | 9/2004 |
| JP | 2005200012 | 7/2005 |
| JP | 2009274498 | 11/2009 |
| JP | 2010100197 | 5/2010 |

\* cited by examiner

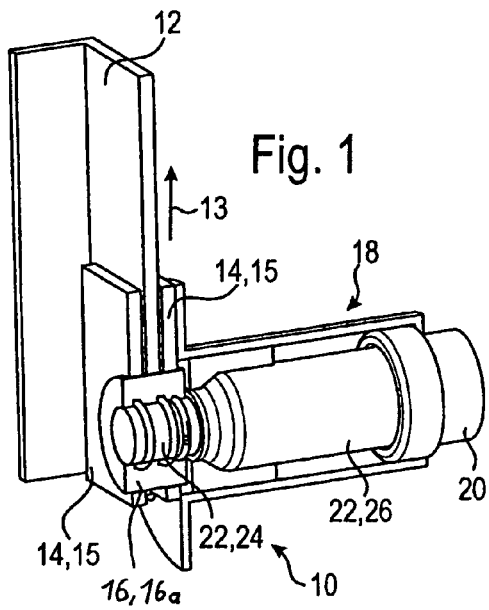
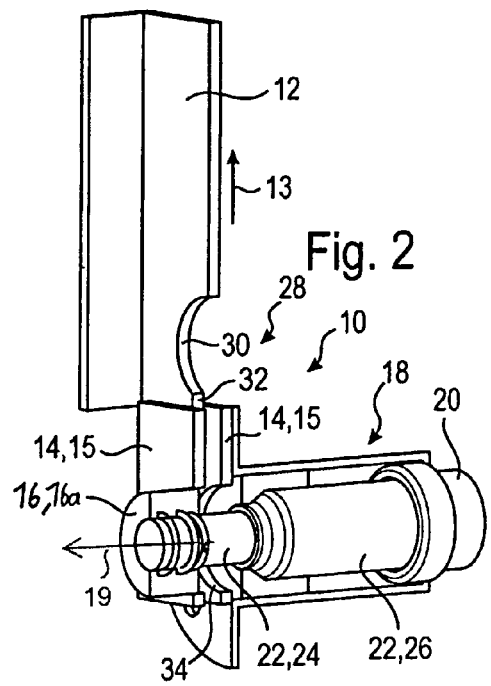
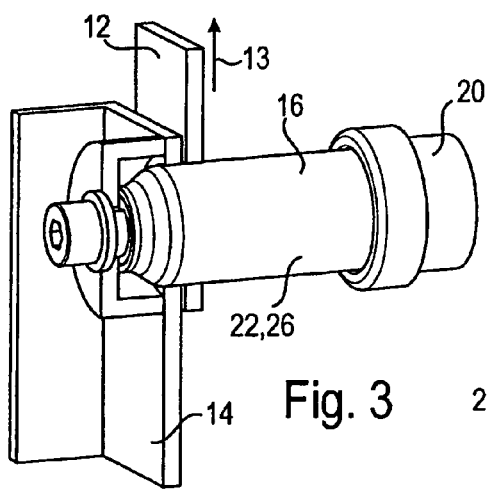
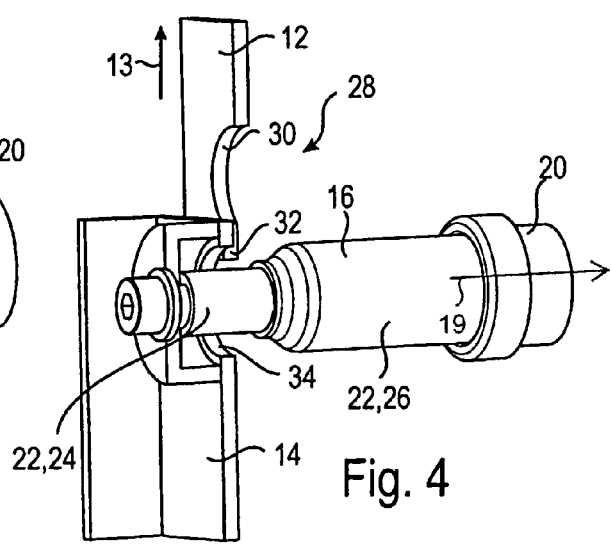

UNLOCKING DEVICE

RELATED APPLICATIONS

This application corresponds to PCT/EP2011/006185, filed Dec. 8, 2011, which claims the benefit of German Application No. 10 2011 013 255.4, filed Mar. 7, 2011, the subject matter, of which are incorporated herein by reference in their entirety.

BACKGROUND OF THE INVENTION

The invention relates to an unlocking device, especially for unlocking two components of a vehicle connected via the unlocking device.

From the state of the art unlocking devices for unlocking two interconnected components of a vehicle are known by which a locking bar can be removed from a locked position. Unlocking devices of this type, also referred to as pulling actuators, are relatively complex and expensive, however.

SUMMARY OF THE INVENTION

Therefore, it is the object of the invention to provide an inexpensive unlocking device which allows for unlocking of two interconnected components in a rapid manner.

The object is achieved by an unlocking device according to the invention, in particular for a vehicle protection device, comprising a locking bar which in a locked position establishes a connection positive at least in portions between a first component to be unlocked and a second component and in an open position permits a relative movement of the two components. The unlocking device further comprises a pyrotechnical actuator including a pyrotechnical element having a propelling charge and a piston-cylinder unit having a piston and a cylinder, wherein a movement of the piston or the cylinder can be generated on the basis of activating the propelling charge. The piston-cylinder unit is connected to the locking bar without redirection so that upon movement of the piston or the cylinder the locking bar can be moved from its locked position into its open position. The pyrotechnical actuator permits release of the locking unit as well as rapid execution of the unlocking. Since the piston-cylinder unit is connected to the locking bar without redirection, i.e. without any rods or lever mimics, a simple and compact design of the unlocking device is allowed, in particular as the piston has a pushing effect. The motion of the piston-cylinder unit is especially linear.

It is possible that the cylinder of the piston-cylinder unit is formed by the second component. In this way the number of required component parts of the unlocking device is reduced.

As an alternative, it is possible that the piston-cylinder unit is a separate subassembly, the cylinder or piston being fastened to the first or second component. In this way, for example, separate manufacture of the piston-cylinder unit as well as simple exchange of the complete piston-cylinder unit is possible.

The locking bar can be formed by the piston of the piston-cylinder unit itself or by a third component mounted on the piston. This enables the locking bar to have a compact design.

A simple direct unlocking can be realized in that the piston and/or the third component mounted on the piston include(s) a locking section and an unlocking section having especially different cross-sections or diameters, the unlocking section preferably forming a recess along which the first component is movable in the unlocking condition.

Alternatively, it is possible to form the locking bar by the cylinder and/or a component connected to the cylinder, wherein the cylinder is movable for unlocking and the locking section of the cylinder is movable away from the first component, preferably by exposing the piston in the area of the first component. Thus very few parts are required for unlocking.

Furthermore, the locking bar can be formed by a stop element at the first or second component which is movable out of the locked position by the piston-cylinder unit, the stop element preferably being an extension that can be plastically deformed by the piston-cylinder unit. The stop element ensures very safe locking which cannot be manually released.

The stop element is an extension formed in particular by plastic deformation.

The first and/or second component can have a locking recess into which the locking bar protrudes at least in the locked position and which forms an undercut in the direction of motion of the first component which undercut is adapted to prevent the first component from moving in the locked position.

It is also possible that the first and/or second component include(s) a locking hole. The locking bar can be completely surrounded by the locking hole, thereby high mechanical stability of the component being obtained.

The piston may consist of several parts, for instance. This permits flexible configuration of the piston and association of different functions with different piston elements.

In order to prevent the locking bar from moving in the home position prior to activation of the unlocking device, a positioning device separate from the piston and the cylinder can be provided for retaining the locking bar in the locked position prior to unlocking, especially to prevent inadvertent unlocking.

In order to prevent the locking bar from returning to the locked position after unlocking, a fixing device is provided for fixing the locking bar in its open position after unlocking.

The locking bar may include an operating element that permits manual locking and unlocking of the unlocking device. In this way, manual unlocking can be performed in addition to the automatic unlocking by the pyrotechnical actuator.

In the afore-described unlocking device the unlocking direction (13) and a direction of motion (19) of the piston (24) or the cylinder (26) can be oriented relative to each other so that an angle formed there between amounts to 45° to 135°, preferably 80° to 100°, especially 90°.

The invention further relates to a vehicle protection device, in particular an occupant protection device, comprising a first component connected to the body and a second component connected to the first component via an afore-described unlocking device. The unlocking device is especially part of a safety system.

A first preferred embodiment of such safety system is a roll-over bar comprising an unlocking device having at least one of the afore-mentioned features.

A second preferred embodiment of such safety system is an active head rest comprising an unlocking device having at least one of the afore-mentioned features. This can especially be a head rest which is movable from a home position to an end position positioned differently therefrom by activating the safety system, especially by a tilting and/or pivoting or lifting motion of the head rest.

A third preferred embodiment of such safety system is a cable and/or line separator in which two contact points can be brought apart, for example by opening a locking of a spring mechanism, comprising an unlocking device having at least one of the afore-mentioned features.

BRIEF DESCRIPTION OF THE DRAWINGS

Further features and advantages of the invention are visible from the following description and from the following drawings which are referred to and illustrate in:

FIG. 1 illustrates an unlocking device according to a first embodiment of the invention in its locked position;

FIG. 2 illustrates the unlocking device according to FIG. 1 in its open position;

FIG. 3 illustrates an unlocking device according to a second embodiment of the invention in its locked position;

FIG. 4 illustrates the unlocking device according to FIG. 3 in its open position;

DESCRIPTION OF THE EMBODIMENTS

Figure 5:
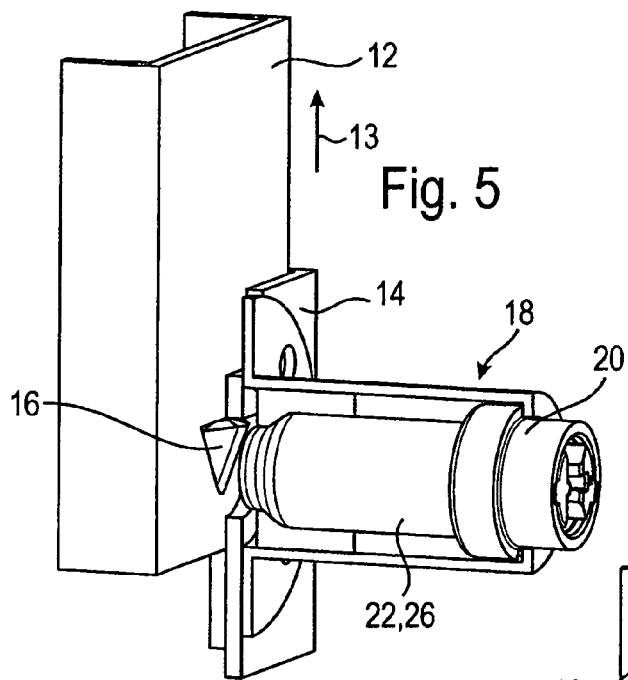
FIG. 5 illustrates an unlocking device according to a third embodiment of the invention in its locked position.

A first embodiment of an unlocking device 10 is illustrated in FIGS. 1 and 2. FIG. 1 shows the unlocking device 10 in its locked position in which the unlocking device 10 establishes a connection between a first component 12 to be unlocked and a second component 14 symbolized by two walls 15 in this case.

The unlocking device 10 comprises the locking bar 16 and a pyrotechnical actuator 18 including a pyrotechnical element 20 having a propelling charge and a piston-cylinder unit 22 having a piston 24 and a cylinder 26. The piston-cylinder unit 22 is connected to the locking bar 16 without redirection so that upon travel of the piston 24 of the piston-cylinder unit 22 the locking bar 16 is linearly pushed from its locked position to an open position. The piston 24 is movable toward a direction of motion 19. In the first embodiment the locking bar 16 is formed by a third component 16a directly mounted on the piston 24, especially by an attached packing.

In the shown embodiment the two components 12, 14 are formed so that a relative movement of the components 12, 14 in an unlocking direction 13 is possible when the unlocking device 10 is in its open position (cf. FIG. 2).

In the first embodiment the direction of motion 19 of the piston 24 and the unlocking direction 13 are oriented to be opposed to each other that an angle provided there between substantially amounts to 90°. It is also possible that said angle is within a range of from 45° to 135°, preferably 80° to 100°.

The first component 12 includes a wall portion having a locking recess 28 forming an undercut in a first section 30. The second component 14 comprises two spaced walls 15 between which the wall portion of the first component 12 can be accommodated. Each of the two walls 15 of the second component 14 includes a locking recess 34. In the locked position of the unlocking device 10 the first section 30 of the locking recess 28 of the first component 12 is aligned toward the two locking recesses 34 of the two walls 15 of the second component 14. The locking bar 16 extends through the three locking recesses 28, 34 and in this way establishes a connection of the two components 12, 14 positive at least in portions. Upon igniting the pyrotechnical element 20 of the pyrotechnical actuator 26 a combustion gas is generated which exerts pressure on the piston 24 inside the cylinder 26 of the piston-cylinder unit 22 so that the piston 24 is displaced and thus a linear motion of the piston 24 relative to the cylinder 26 takes place.

The piston 24 is thus pushed out of the cylinder 26, whereby the locking bar 16 mounted on the piston 24 is pushed at least out of the locking recess 28 of the first component 12.

The locking recess 28 of the first component 12 includes, as described, a first section 30 forming an undercut in the direction of motion 13 of the first component 12 for accommodating the locking bar 16. The locking recess 28 further includes a second section 32 which is configured to engage behind the locking bar in the locked condition at least in portions and prevents the first component 12 from moving in the direction of motion 13. The section 32 extends, substantially perpendicularly, to the direction of motion so far compared to the cross-section of the piston 24 that the first component 12 can be displaced in the direction of motion 13 as soon as the locking bar 16 is displaced and only the piston 24 having a smaller cross-section is positioned in the locking recess 28.

In this way the first component 12 is unlocked (cf. FIG. 2).

In the first embodiment each of the locking recesses 28, 34 is designed as a semicircular recess at a rim of the first or second component 12, 14. The locking recesses 28, 34 can also be designed to be mirror-symmetric, though, wherein the locking recess 28 of the first component 12 has a recessed shape exhibiting a wide first section 30 and a tapered second section 32.

A second embodiment of the unlocking device 10 is shown in FIGS. 3 and 4. In this embodiment the piston 24 is mounted on the second component 14 and the cylinder 26 is movably supported so that upon activation of the pyrotechnical actuator 18 the movable cylinder 26 of the piston-cylinder unit 22 can carry out a motion relative to the second component 14.

In the second embodiment the locking bar 16 is formed by the cylinder 26 of the piston-cylinder unit 22. As shown in FIG. 3, the cylinder 26 engages in the first section 30 of the locking recess 28 of the first component 12 and forms a connection positive at least in portions with the same.

Upon activation of the pyrotechnical actuator 18 the propelling charge of the pyrotechnical element 20 generates a gas volume which forces the piston 24 and the cylinder 26 of the piston-cylinder unit 22 apart, pushes the cylinder 26 out of the locking recess 28 and thus unlocks the first component 12. The cylinder 26 can be displaced toward a direction of motion 19. A second section 32 of the locking recess 28 is configured in turn so that the piston 24 having a radius inferior to that of the cylinder 26 constitutes no locking vis-à-vis the second section 32 so that the first component can be displaced along the piston 24 in the unlocking direction 13.

In the second embodiment the direction of motion 19 of the cylinder 26 and the unlocking direction 13 are positioned to be opposed so that an angle between said two directions substantially amounts to 90°.

Figure 6:
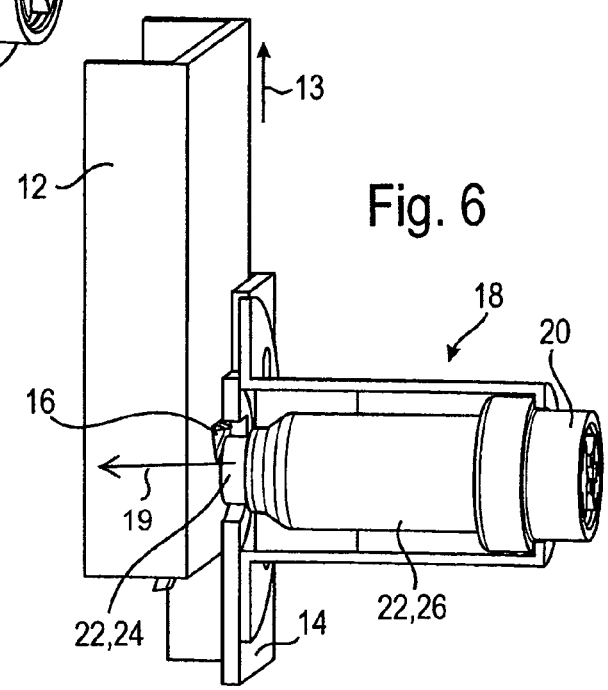
FIG. 6 illustrates the said unlocking device according to FIG. 5 in the activated position of the piston.
Figure 7:
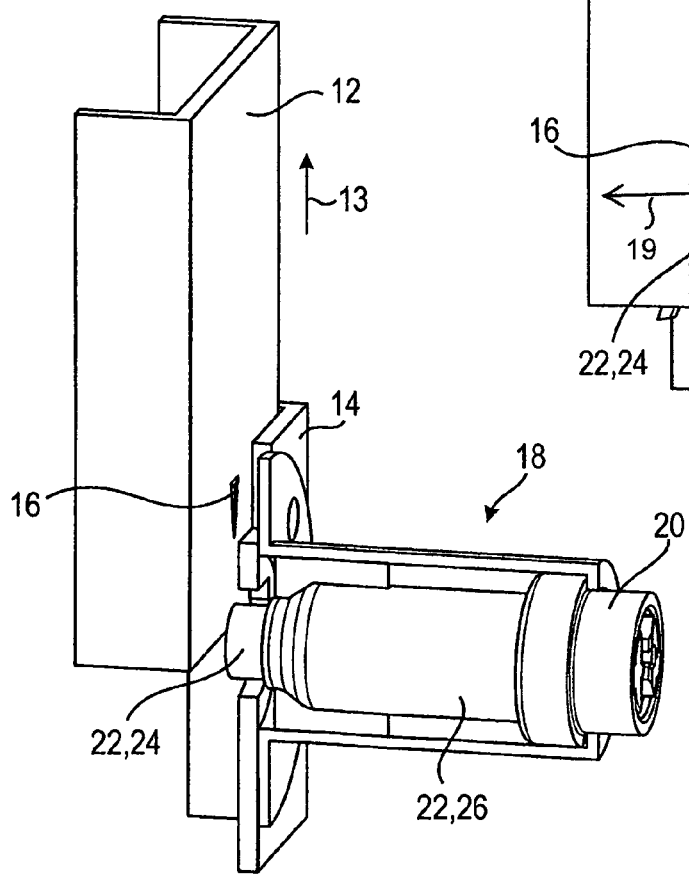
FIG. 7 illustrates the said unlocking device according to FIGS. 5 and 6 in its open position.

A third embodiment is illustrated in FIGS. 5, 6 and 7, wherein the locking bar 16 is formed by a stop element at the first component 12. The stop element is engaged in the locked position in FIG. 5 in a locking recess 34 in the form of a hole in the second component 14, thereby preventing a relative motion of the first and second components 12, 14 in the direction of motion 13. The stop element is an opened wall portion of the first component 12 in the shown embodiment.

The piston-cylinder unit 22 of the pyrotechnical actuator 18 is arranged so that the piston 24 is directed toward the stop element. Upon activation of the pyrotechnical actuator 18 the propelling charge of the pyrotechnical element 20 generates a gas volume forcing the piston 24 out of the cylinder 26 of the piston-cylinder unit 22.

The piston 24 abuts against the stop element and deforms the latter so that the locking engagement with the locking recess 34 of the second component 14 is released, as is shown in FIG. 6.

In the illustrated embodiment the stop element is plastically deformed so that the unlocking device 10 is permanently unlocked. FIG. 7 shows the unlocking device 10 in the open position with the stop element being deformed.

As an alternative, the stop element can be formed so that the piston 24 causes a purely elastic deformation of the stop element. In this way a connection of the components 12, 14 can be established again even after triggering the pyrotechnical actuator 18 by returning the component 12, for example, into its original position, a locked position, preferably by manually moving the component 12.

Figure 8:
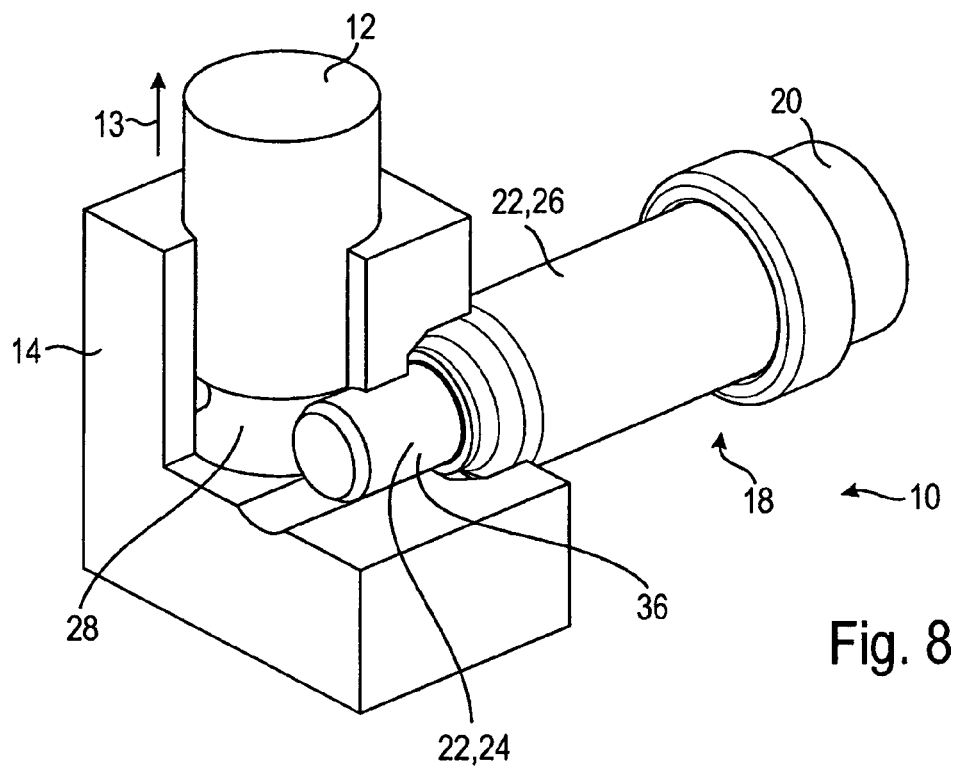
FIG. 8 illustrates an unlocking device according to a fourth embodiment of the invention in its locked position.
Figure 9:
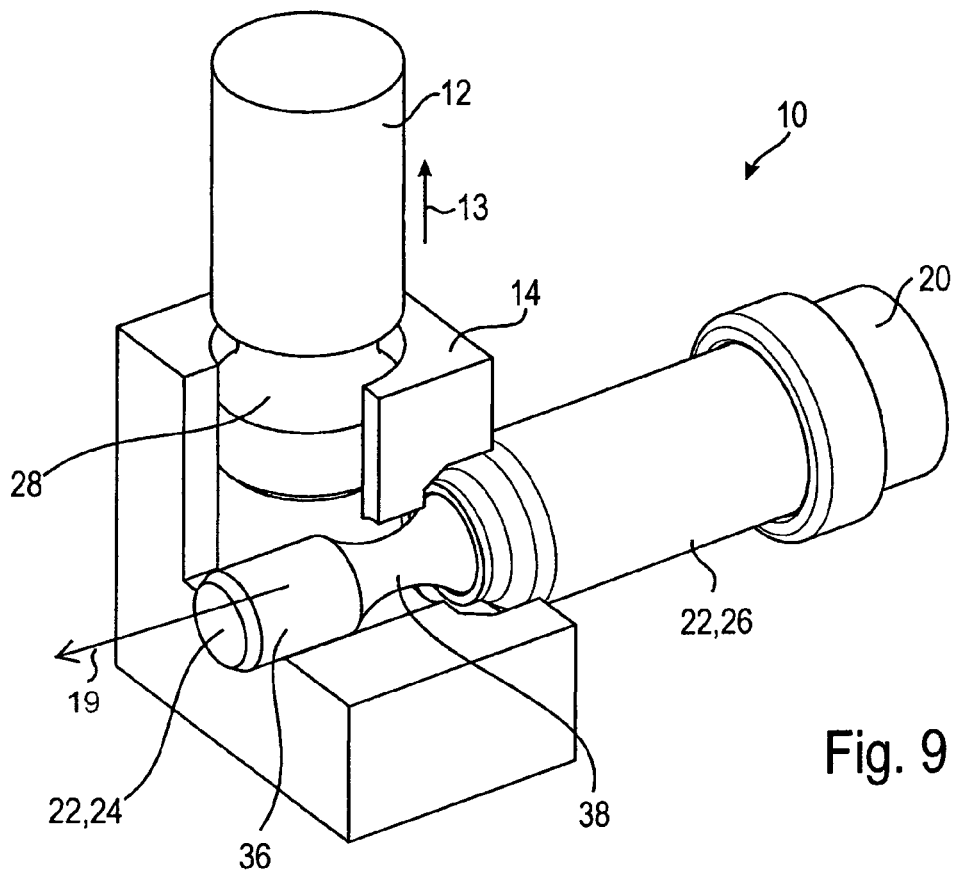
FIG. 9 illustrates the said unlocking device according to FIG. 8 in its unlocked position.

A fourth embodiment is illustrated in FIGS. 8 and 9 in a three-dimensional view. The first component 12 is in the form of a cylindrical journal having a locking recess 28, the locking recess 28 being a groove extending in circumferential direction. The piston-cylinder unit 22 of the pyrotechnical actuator 18 is mounted on the second component 14 by the cylinder 26.

In FIG. 8 the piston 24 engages with a locking portion 36 in the groove of the locking recess 28 of the first component 12, thereby a connection positive at least in portions being made between the first and second components 12, 14. Upon activation of the pyrotechnical actuator 18, the propelling charge of the pyrotechnical element 20 ignites and generates a gas volume forcing the piston 24 out of the cylinder 26 of the piston-cylinder unit 22 into the open position of the unlocking device 10. The open position of the unlocking device 10 is shown in FIG. 9.

The piston 24 includes an unlocking portion 38 having a reduced cross-section compared to the locking portion 36. Due to the reduced cross-section of the locking portion 38, the positive connection between the first component 12 and the second component 14 is released in the open position in FIG. 9. The unlocking portion 38 forms a recess along which the first component 12 can move in the unlocked condition along an unlocking direction 13.

Figure 10:
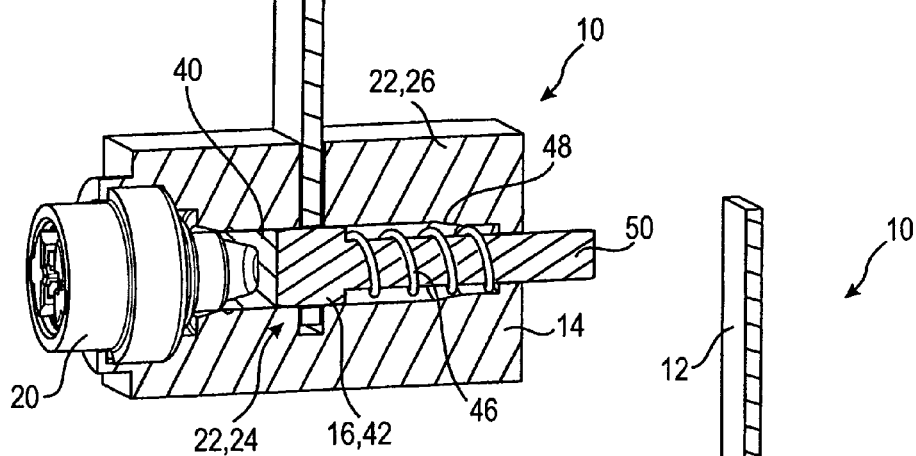
FIG. 10 illustrates an unlocking device according to a fifth embodiment of the invention in its locked position.
Figure 11:
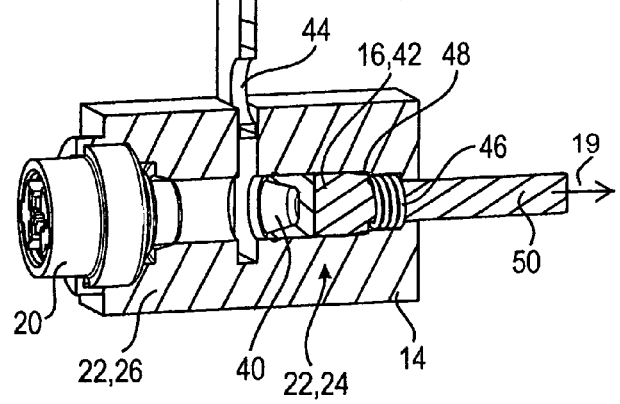
FIG. 11 illustrates the said unlocking device according to FIG. 10 in its open position.
Figure 12:
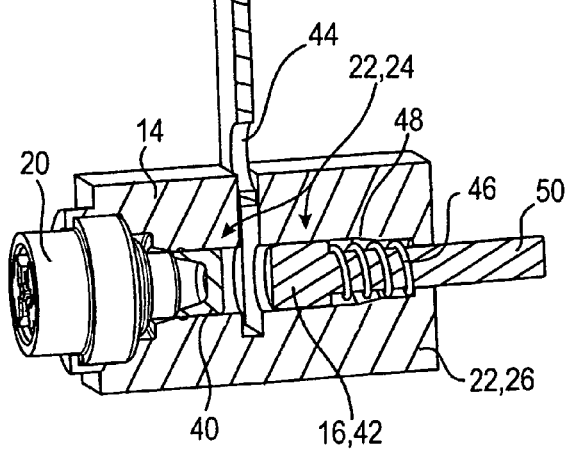
FIG. 12 illustrates the said unlocking device according to FIGS. 10 and 11 when being manually unlocked.

The FIGS. 10, 11 and 12 illustrate a fifth embodiment of the invention. In this embodiment the cylinder 26 of the piston-cylinder unit 22 is formed by the second component 14.

The piston 24 of the piston-cylinder unit 22 is formed in two parts having a push element 40 and a locking element 42.

FIG. 10 illustrates the locked position of the unlocking device 10, wherein the first component 12 to be unlocked having a locking hole 44 which is completely confined by the first component 12. The locking element 42 of the piston 24 extends through the locking hole 44 and establishes a connection positive at least in portions between the first component 12 and the second component 14. The push element 40 of the piston 24 is directly adjacent to the pyrotechnical element 20 of the pyrotechnical actuator 18.

A spring serves as positioning means 46 for applying force to the piston 24 with the push element 40 and the locking element 42 in the locked position of the unlocking device, whereby the piston 24, especially the locking element 42 thereof, is retained in the locked position.

Upon igniting the pyrotechnical actuator 18, the propelling charge of the pyrotechnical element 20 releases a gas volume forcing the push element 40 of the piston 24 against the locking element 42 and moving the same out of the locked position into the open position of the unlocking device 10 shown in FIG. 11.

A fixing device 48 is provided for fixing the locking element 42 in its open position after unlocking. Fixing is performed by forcing, due to activation of the pyrotechnical actuator 18, the locking element 42 into a tapered section of the cylinder 26, especially a guiding bore for the piston 24 and clamping it in the same.

In the open position the locking element 42 and the push element 40 of the piston 24 have completely penetrated the locking hole 44 so that the positive connection of the first and second components 12, 14 is released by the locking element 42.

FIG. 12 illustrates the unlocking device 10 before igniting the pyrotechnical actuator 18 in a mounting position. The locking element 42 includes an operating element 50 projecting from the second component 14 and enables the locking element 42 and thus the locking bar 16 to be manually displaced. In the mounting position the locking element 42 is pulled by the operating element 50 into an unlocked position against the spring force of the positioning means 46, while the push element 40 continues being arranged directly at the pyrotechnical element 20 so that a gap is formed between the push element 40 and the locking element 42. In this position the first component 12 can be inserted in the second component 14 and in the gap. After that the operating element 50 can be released, whereby the locking element 42 is brought into the locked position by the spring of the positioning means 46 and the gap is closed.

Apart from mounting the unlocking device 10, in this way basic manual locking and unlocking of the unlocking device 10 can be made possible.

Various features of the different embodiments can also be combined with each other. In particular positioning means 46 can be provided which are intended to retain the locking bar 16 in the locked position prior to unlocking.

As an alternative to positioning means forcing the locking bar into its locked position, also positioning means can be provided for fixing e.g. the locking bar by predetermined breaking points in its home position, the predetermined breaking points being designed so that they are retained with standard loads and are breaking in the case of release upon activation of the pyrotechnical actuator 18 and enable the locking bar 16 to move.

Furthermore fixing devices can be provided for fixing the locking bar 16 in its open position after unlocking.

The unlocking devices 10 are provided for unlocking interconnected components of a vehicle, wherein the first or second component 12, 14 is connected to the car body and the other component 12, 14 is connected to the first or second component 12, 14 via the unlocking device 10.

The invention claimed is:

1. An unlocking device (10) for a vehicle protection device, comprising:
   a locking bar (16) which in a locked position establishes a connection positive at least in portions between a first component (12) to be unlocked and a second component (14) and allows relative movement of the two components (12, 14) in an open position, and a pyrotechnical actuator (18) including a pyrotechnical element (20) having a propelling charge and a piston-cylinder unit (22) having a piston (24) and a cylinder (26), wherein a motion of the piston (24) or the cylinder (26) can be generated due to activation of the propelling charge, wherein the piston-cylinder unit (22) is connected to the locking bar (16) without redirection so that upon moving the piston (24) or the cylinder (26) the locking bar (16) can be moved from its locked position into its open position, and wherein at least one of the first and second component (12, 14) include(s) a locking recess (28, 34) into which the locking bar (16) protrudes at least in the locked position and which forms an undercut in the direction of motion (13) of the first component (12), the undercut being adapted to prevent motion of the first component (12) in the locked position.

2. The unlocking device according to claim 1, wherein the cylinder (26) of the piston-cylinder unit (22) is formed by the second component (14), and the locking bar (16) is formed by the piston (24) of the piston-cylinder unit (22) itself or a third component (16a) mounted on the piston (24).

3. The unlocking device according to claim 1, wherein the piston-cylinder unit (22) constitutes a separate subassembly, with the cylinder (26) or the piston (24) being mounted on the first or second component (12, 14).

4. The unlocking device according to claim 1, wherein the locking bar (16) is constituted by at least one of the cylinder (26) and a component connected to the cylinder (26), wherein the cylinder (26) is movable for unlocking and the locking portion of the cylinder (26) is movable away from the first component (12) by exposing the piston (24) in the area of the first component (12).

5. The unlocking device according to claim 1, wherein the unlocking direction (13) and a direction of motion (19) of the piston (24) or the cylinder (26) are aligned with respect to each other so that an angle there between amounts to 45° to 135°.

6. A vehicle protection means comprising an unlocking device (10) according to claim 1, wherein the first or second component (12, 14) of the unlocking device (10) is connected to the vehicle body and the other component (14, 12) is connected to the first or second component (12, 14) via the unlocking device (10).

7. An unlocking device (10) for a vehicle protection device, comprising:
a locking bar (16) which in a locked position establishes a connection positive at least in portions between a first component (12) to be unlocked and a second component (14) and allows relative movement of the two components (12, 14) in an open position,
and a pyrotechnical actuator (18) including a pyrotechnical element (20) having a propelling charge and a piston-cylinder unit (22) having a piston (24) and a cylinder (26),
wherein a motion of the piston (24) or the cylinder (26) can be generated due to activation of the propelling charge,
wherein the piston-cylinder unit (22) is connected to the locking bar (16) without redirection so that upon moving the piston (24) or the cylinder (26) the locking bar (16) can be moved from its locked position into its open position, and
wherein the piston (24) and/or the third component (16a) mounted on the piston include(s) a locking portion (36) and an unlocking portion (38) having especially different cross-sections or diameters, wherein the unlocking portion (38) forms a recess along which the first component (12) is movable in the unlocked condition.

8. An unlocking device (10) for a vehicle protection device, comprising:
a locking bar (16) which in a locked position establishes a connection positive at least in portions between a first component (12) to be unlocked and a second component (14) and allows relative movement of the two components (12, 14) in an open position,
and a pyrotechnical actuator (18) including a pyrotechnical element (20) having a propelling charge and a piston-cylinder unit (22) having a piston (24) and a cylinder (26),
wherein a motion of the piston (24) or the cylinder (26) can be generated due to activation of the propelling charge,
wherein the piston-cylinder unit (22) is connected to the locking bar (16) without redirection so that upon moving the piston (24) or the cylinder (26) the locking bar (16) can be moved from its locked position into its open position, and wherein the locking bar (16) is formed by a stop element on the first or second component (12, 14), which stop element is movable out of the locked position by the piston-cylinder unit (22), the stop element being an extension that can be plastically deformed by the piston-cylinder unit (22).

9. An unlocking device (10) for a vehicle protection device, comprising:
a locking bar (16) which in a locked position establishes a connection positive at least in portions between a first component (12) to be unlocked and a second component (14) and allows relative movement of the two components (12, 14) in an open position,
and a pyrotechnical actuator (18) including a pyrotechnical element (20) having a propelling charge and a piston-cylinder unit (22) having a piston (24) and a cylinder (26),
wherein a motion of the piston (24) or the cylinder (26) can be generated due to activation of the propelling charge,
wherein the piston-cylinder unit (22) is connected to the locking bar (16) without redirection so that upon moving the piston (24) or the cylinder (26) the locking bar (16) can be moved from its locked position into its open position, and
wherein the piston (24) is designed to consist of several parts.

10. The unlocking device according to claim 9, wherein a fixing device (48) is provided for fixing the locking bar (16) after unlocking in its open position.

11. The unlocking device according to claim 9, wherein the locking bar (16) includes an operating element (50) which allows manual locking and unlocking of the unlocking device (10).

12. The locking device according to claim 9, wherein at least one of the first and second component (12,14) includes a locking hole (44).

13. The unlocking device according to claim 9, wherein a positioning means (46) separate from the piston (24) and the cylinder (26) is provided for retaining the locking bar (16) in the locked position to prevent inadvertent unlocking.

* * * * *